(12) United States Patent
Ohzu

(10) Patent No.: US 11,056,937 B2
(45) Date of Patent: Jul. 6, 2021

(54) ROTOR CORE

(71) Applicant: HONDA MOTOR CO., LTD., Tokyo (JP)

(72) Inventor: Tatsuya Ohzu, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 134 days.

(21) Appl. No.: 16/597,214

(22) Filed: Oct. 9, 2019

(65) Prior Publication Data

US 2020/0119601 A1    Apr. 16, 2020

(30) Foreign Application Priority Data

Oct. 10, 2018   (JP) .............................. JP2018-192065

(51) Int. Cl.
*H02K 1/27* (2006.01)
*H02K 1/28* (2006.01)

(52) U.S. Cl.
CPC ............... *H02K 1/274* (2013.01); *H02K 1/28* (2013.01)

(58) Field of Classification Search
CPC ...... H02K 1/274; H02K 1/28; H02K 2213/03; H02K 1/2766; H02K 1/30
See application file for complete search history.

(56) References Cited

U.S. PATENT DOCUMENTS

| 2012/0256516 A1 | 10/2012 | Matsushita et al. |
| 2020/0106315 A1* | 4/2020 | Yoneda ................ H02K 1/2706 |

FOREIGN PATENT DOCUMENTS

WO    WO 2011/077522 A1    6/2011

* cited by examiner

*Primary Examiner* — Thomas Truong
(74) *Attorney, Agent, or Firm* — Paratus Law Group, PLLC

(57) ABSTRACT

A rotor core includes: a rotor shaft hole into which a rotor shaft is press-fitted; a first hole group having a plurality of holes; a shaft holding portion; a second hole group having a plurality of holes; a first annular portion; and an electromagnetic portion having a plurality of magnet insertion holes. Each hole of the second hole group is arranged to intersect with an extension line of a rib formed between the adjacent holes of the first hole group. An inner peripheral wall of each hole of the second hole group includes: a first arc point and a second arc point being located on an arc equidistant from a center of the rotor core; and a convex portion having an apex portion on an outer side further than the arc. The apex portion is located between the adjacent holes of the first hole group in the circumferential direction.

6 Claims, 3 Drawing Sheets

ROTOR CORE

CROSS-REFERENCE TO RELATED APPLICATIONS

The present application claims the benefit of priority of Japanese Patent Application No. 2018-192065, filed on Oct. 10, 2018, the content of which is incorporated herein by reference.

TECHNICAL FIELD

The present invention relates to a rotor core which constitutes a rotor of a motor.

BACKGROUND ART

WO 2011/077522 discloses a rotor core which includes a rotor shaft hole, a first hole group provided on the outer side of the rotor shaft hole in a radial direction and having a plurality of holes arranged in a circumferential direction, a shaft holding portion provided between the rotor shaft hole and the first hole group in the radial direction, a second hole group provided on the outer side of the first hole group in the radial direction and having a plurality of holes arranged in the circumferential direction, a first annular portion provided between the first hole group and the second hole group in the radial direction, and an electromagnetic portion provided on the outer side of the second hole group in the radial direction and having a plurality of magnet insertion holes into which magnets are respectively inserted.

In this type of rotor core, the first hole group, the second hole group, and the first annular portion function as a region for absorbing a tightening load of the rotor shaft. In the rotor core disclosed in WO 2011/077522, each hole of the second hole group is arranged to intersect with an extension line of a rib formed between the adjacent holes of the first hole group, and therefore, the hole of the second hole group can absorb a tightening load of the rotor shaft transmitted to the first annular portion through the rib located between the adjacent holes of the first hole group.

However, in the rotor core disclosed in WO 2011/077522, when a tightening load is applied to the first annular portion through the rib between the holes of the first hole group, stress concentration may occur in the first annular portion, which may cause an unintended deformation. On the other hand, when the tightening load of the rotor shaft is reduced, the rotor core may be pulled to the outer peripheral side when a centrifugal force is applied, which may make it not possible to secure an adequate interference between the rotor shaft and the rotor core.

SUMMARY

The invention provides a rotor core capable of suppressing reduction of interference due to the widening of a rotor shaft hole by the centrifugal force and alleviating stress concentration due to a tightening load of a rotor shaft.

According to an aspect of the invention, there is provided a rotor core including: a rotor shaft hole into which a rotor shaft is press-fitted; a first hole group provided on an outer side of the rotor shaft hole in a radial direction and having a plurality of holes arranged in a circumferential direction; a shaft holding portion provided between the rotor shaft hole and the first hole group in the radial direction; a second hole group provided on an outer side of the first hole group in the radial direction and having a plurality of holes arranged in the circumferential direction; a first annular portion provided between the first hole group and the second hole group in the radial direction; and an electromagnetic portion provided on the outer side of the second hole group in the radial direction and having a plurality of magnet insertion holes in which magnets are respectively inserted, wherein: each hole of the second hole group is arranged to intersect with an extension line of a rib formed between the adjacent holes of the first hole group; an inner peripheral wall of each hole of the second hole group includes: a first arc point and a second arc point which are located on an arc equidistant from a center of the rotor core; and a convex portion having an apex portion on an outer side further than the arc in the radial direction; and the apex portion is located between the adjacent holes of the first hole group in the circumferential direction.

EFFECTS

According to the invention, the stress concentration due to the tightening load of the rotor shaft can be alleviated by the deformation of the convex portion, and thus unintended deformation of the rotor core can be suppressed. In addition, since the stress concentration can be alleviated by the deformation of the convex portion, it is not necessary to lower the tightening load of the rotor shaft and it is possible to suppress the reduction of the interference due to the widening of the rotor shaft hole by the centrifugal force.

DESCRIPTION OF EMBODIMENTS

Hereinafter, an embodiment of the invention will be described with reference to FIGS. 1 to 3. The drawings are viewed in the direction of the reference signs.

[Rotor Core]

A rotor core 1 is configured by laminating a plurality of electromagnetic steel plates in an axial direction of a rotor shaft 2 and constitutes a rotor of a motor together with the rotor shaft 2 and a plurality of magnets 3 assembled to the rotor core 1.

Figure 1:
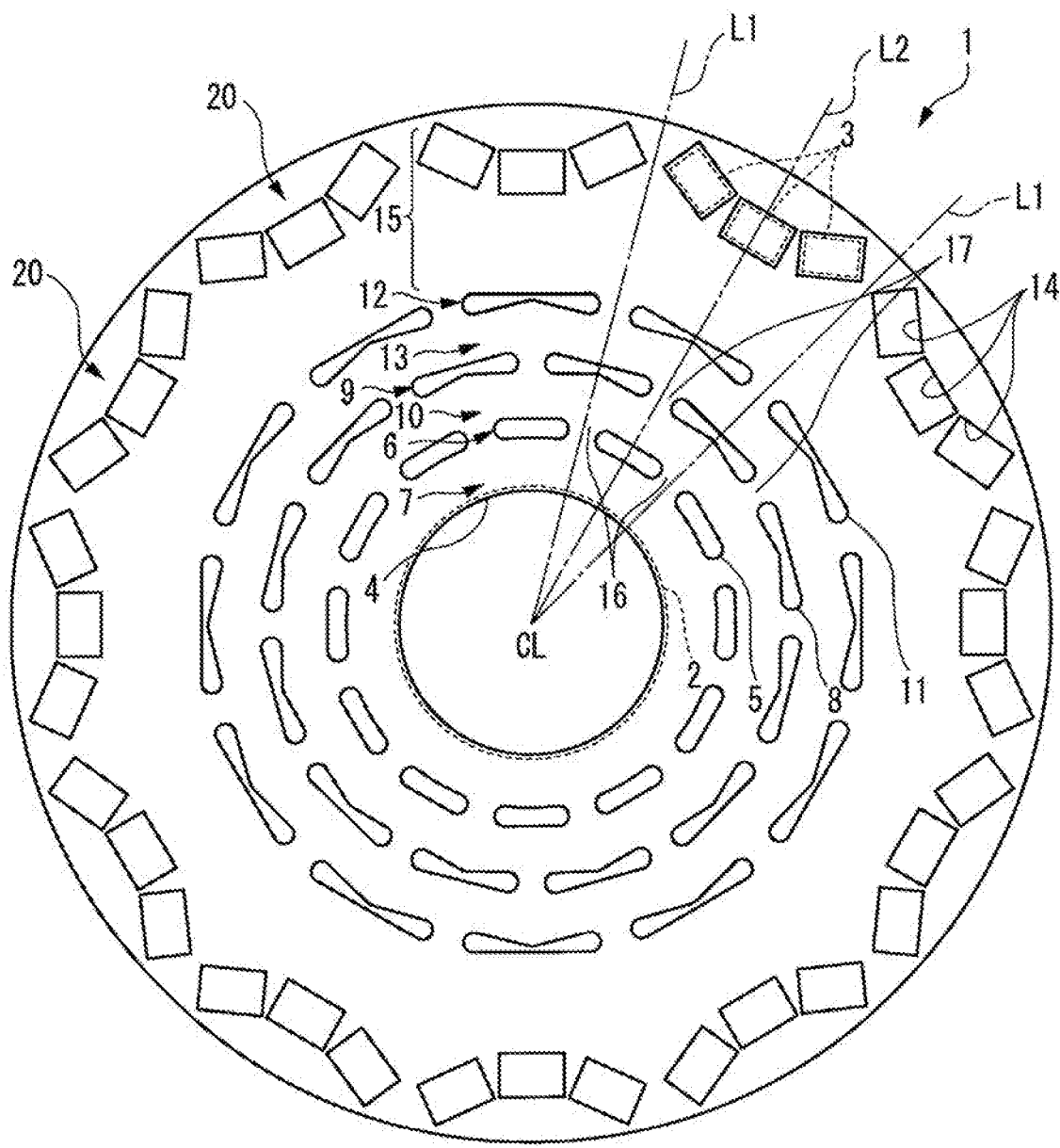
FIG. 1 is a front view of a rotor core according to an embodiment of the invention.

As illustrated in FIG. 1, the rotor core 1 of the embodiment includes a rotor shaft hole 4 into which the rotor shaft 2 is press-fitted, a first hole group 6 provided on the outer side of the rotor shaft hole 4 in a radial direction and having a plurality of holes 5 arranged in a circumferential direction, a shaft holding portion 7 provided between the rotor shaft hole 4 and the first hole group 6 in the radial direction, a second hole group 9 provided on the outer side of the first hole group 6 in the radial direction and having a plurality of holes 8 arranged in the circumferential direction, a first annular portion 10 provided between the first hole group 6 and the second hole group 9 in the radial direction, a third hole group 12 provided on the outer side of the second hole group 9 in the radial direction and having a plurality of holes 11 arranged in the circumferential direction, a second annular portion 13 provided between the second hole group 9 and the third hole group 12 in the radial direction, and an electromagnetic portion 15 provided on the outer side of the third hole group 12 in the radial direction and having a plurality of magnet insertion holes 14 into which the magnets 3 are respectively inserted.

The magnet 3 is, for example, a permanent magnet such as neodymium magnet, and in the embodiment, one magnetic pole portion 20 is constituted by three magnets 3 arranged in three magnet insertion holes 14 arranged in an arc shape.

The first hole group 6, the second hole group 9, and the third hole group 12, and the first annular portion 10 and the second annular portion 13 formed by those hole groups 6, 9, and 12 function as an area for absorbing radial deformation due to the press-fitted load of the rotor shaft 2 with respect to the rotor shaft hole 4. Further, although the rotor core 1 of the embodiment forms two annular portions 10 and 13 by three hole groups 6, 9, and 12, one annular portion 10 may be formed by two hole groups 6 and 9.

[Arrangement of Hole]

Figure 2:
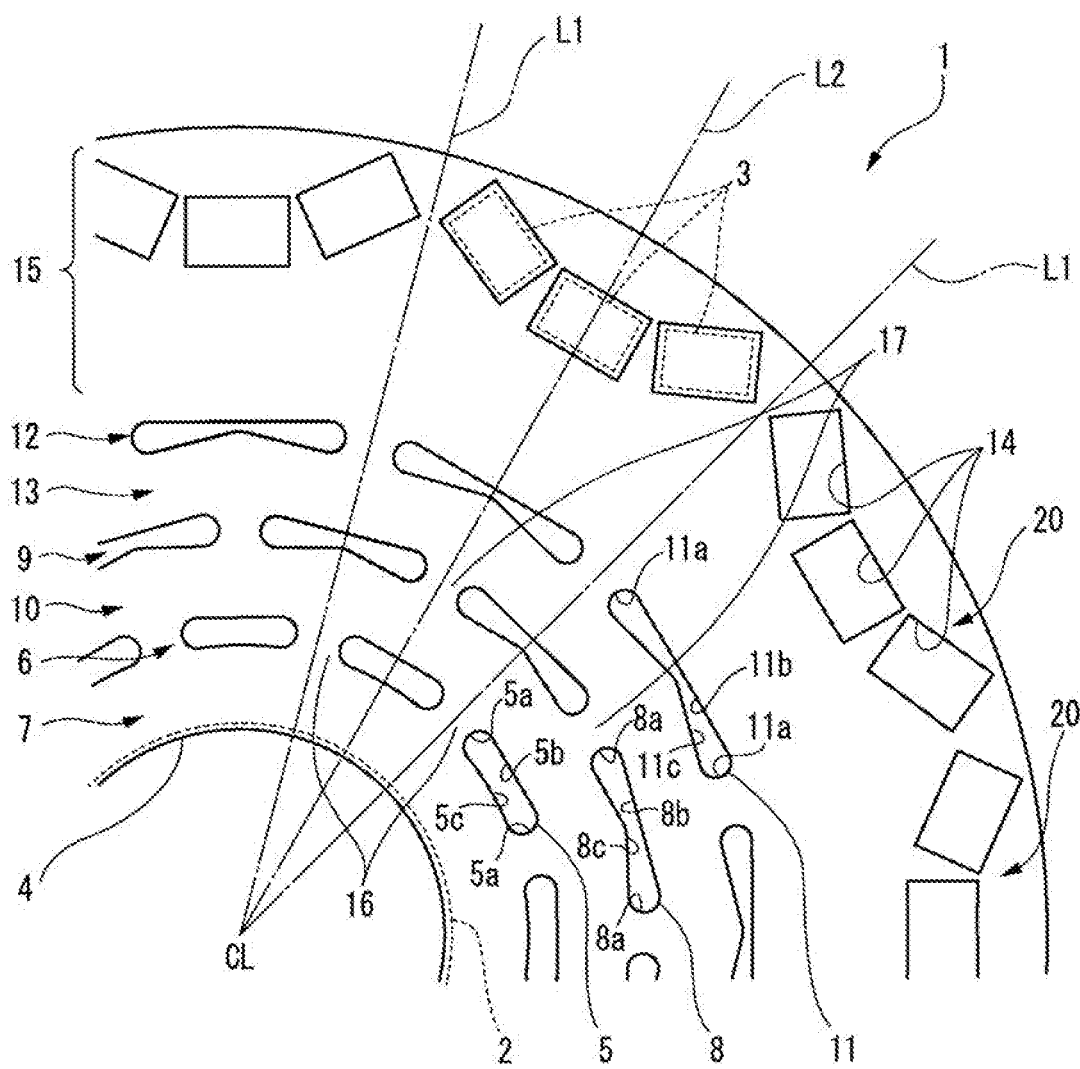
FIG. 2 is a partially enlarged view of FIG. 1.

As illustrated in FIG. 2, each hole 8 of the second hole group 9 is arranged to intersect with an extension line L1 of a rib 16 formed between the adjacent holes 5 of the first hole group 6. That is, since the hole 5 of the first hole group 6 and the hole 8 of the second hole group 9 are alternately arranged in the circumferential direction, the press-fitted load transmitted to the first annular portion 10 through the rib 16 located between the adjacent holes 5 of the first hole group 6 can be absorbed by the hole 8 of the second hole group 9.

Further, each hole 8 of the second hole group 9 has a circumferential length longer than that of the rib 16 located between the adjacent holes 5 of the first hole group 6, and each hole 8 circumferentially overlaps both of the adjacent holes 5 interposing the rib 16. The extension line L1 is a line passing through a circumferential center position of the rib 16. In the embodiment, the extension line L1 coincides with a line (q axis) passing through one circumferential end portion or the other circumferential end portion of each magnetic pole portion 20 and a center CL of the rotor core 1. Each hole 8 of the second hole group 9 is arranged to intersect with the extension line L1 at the circumferential center position.

In addition, each hole 11 of the third hole group 12 is arranged to intersect with an extension line L2 of a rib 17 formed between the adjacent holes 8 of the second hole group 9. That is, since the hole 8 of the second hole group 9 and the hole 11 of the third hole group 12 are alternately arranged in the circumferential direction, the press-fitted load transmitted to the second annular portion 13 through the rib 17 located between the adjacent holes 8 of the second hole group 9 can be absorbed by the hole 11 of the third hole group 12.

Further, each hole 11 of the third hole group 12 has a circumferential length longer than that of the rib 17 located between the adjacent holes 8 of the second hole group 9, and each hole 11 circumferentially overlaps both of the adjacent holes 8 interposing the rib 17. The extension line L2 is a line passing through a circumferential center position of the rib 17. In the embodiment, the extension line L2 coincides with a line (d axis) passing through a circumferential center portion of each magnetic pole portion 20 and the center CL of the rotor core 1. Each hole 11 of the third hole group 12 is arranged to intersect with the extension line L2 at the circumferential center position.

Also, the plurality of holes 5 of the first hole group 6, the plurality of holes 8 of the second hole group 9, and the plurality of holes 11 of the third hole group 12 are arranged at equal intervals in the circumferential direction. As a result, each hole group 6, 9, or 12 can receive the press-fitted load equally over the whole circumferential direction.

[Shape of Hole]

As illustrated in FIG. 2, the holes 5, 8, and 11 of respective hole groups 6, 9, and 12 have long hole shapes extending in the circumferential direction and have end portion walls 5a, 8a, and 11a forming both end portions in the circumferential direction, outer peripheral walls 5b, 8b, and 11b forming the radially outer side, and inner peripheral walls 5c, 8c, and 11c forming the radially inner side. The holes 5, 8, and 11 of the embodiment have the end portion walls 5a, 8a, and 11a having an arc shape and the outer peripheral walls 5b, 8b, and 11b having a linear shape. However, the shapes of the end portion walls 5a, 8a, and 11a and the outer peripheral walls 5b, 8b, and 11b can be changed as appropriate.

Figure 3:
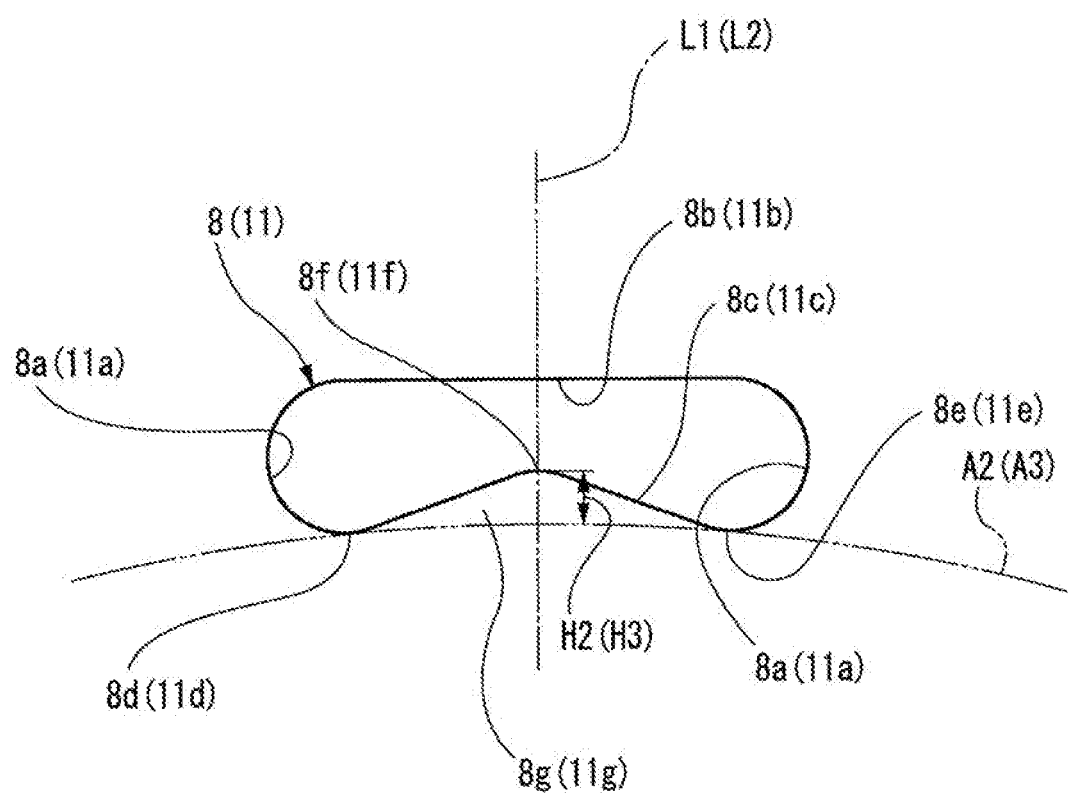
FIG. 3 is an enlarged view of a hole in a second hole group (third hole group).

As illustrated in FIG. 3, the inner peripheral walls 8c and 11c of the holes 8 and 11 of the second hole group 9 and the third hole group 12 include first arc points 8d and 11d and second arc points 8e and 11e located on arcs A2 and A3 which are equidistant from the center CL of the rotor core 1, and convex portions 8g and 11g having apex portions 8f and 11f on the outer side further than the arcs A2 and A3 in the radial direction. The apex portion 8f of the hole 8 of the second hole group 9 is located between the adjacent holes 5 of the first hole group 6 in the circumferential direction and the apex portion 11f of the hole 11 of the third hole group 12 is located between the adjacent holes 8 of the second hole group 9 in the circumferential direction.

Each hole 8 of the second hole group 9 can reduce the press-fit stress in the first annular portion 10 with respect to the press-fitted load by deforming so that the convex portion 8g located between the adjacent holes 5 of the first hole group 6 in the circumferential direction is pulled radially outward. As a result, it is possible to suppress the occurrence of uneven deformation at an unintended portion of the rotor core 1.

Each hole 11 of the third hole group 12 can reduce the press-fit stress in the second annular portion 13 with respect to the press-fitted load by deforming so that the convex portion 11g located between the adjacent holes 8 of the second hole group 9 in the circumferential direction is pulled radially outward.

In addition, since the inner peripheral walls 5c of respective holes 5 of the first hole group 6 are formed along an arc equidistant from the center CL of the rotor core 1, the press-fitted load can be received firmly.

The apex portion 8f is located at the center (on the extension line L1) between the adjacent holes 5 of the first hole group 6 in the circumferential direction and the apex portion 11f is located at the center (on the extension line L2) between the adjacent holes 8 of the second hole group 9 in the circumferential direction. In this way, the convex portions 8g and 11g can more effectively alleviate the press-fit stress.

In the plurality of holes 8 of the second hole group 9, distances H2 from the arc A2 to the apex portions 8f are all equal, and in the plurality of holes 11 of the third hole group 12, distances H3 from the arc A3 to the apex portions 11f are all equal. In this way, the deformation in the plurality of holes 8 of the second hole group 9 and the deformation in the plurality of holes 11 of the third hole group 12 can be respectively equalized.

In the embodiment described above, modifications, improvements, and the like can be made as appropriate.

For example, the rotor core 1 may have two hole groups (first hole group 6, second hole group 9) in the radial direction and the third hole group 12 is not necessarily required. On the other hand, there may be other hole groups outside the third hole group 12 in the radial direction.

In addition, the number and shape of the holes 5, 8, and 11 of the hole groups 6, 9, and 12 can be appropriately changed. The outer peripheral walls 8*b* and 11*b* may be flat surfaces orthogonal to the extension lines L1 and L2 or may be arcing surfaces centered on the center CL of the rotor core 1 as long as the inner peripheral walls 8*c* and 11*c* of the holes 8 and 11 have convex portions 8*g* and 11*g*.

Further, the extension line L1 of the rib 16 does not have to coincide with a line (q axis) passing through one circumferential end portion or the other circumferential end portion of each magnetic pole portion 20 and the center CL of the rotor core 1 and the extension line L2 of the rib 17 does not have to coincide with a line (d axis) passing through the circumferential center portion of each magnetic pole portion 20 and the center CL of the rotor core 1.

At least the following matters are described in the specification. In addition, although the constituent components corresponding to those in the embodiment described above are described, it is not limited thereto.

(1) A rotor core (rotor core 1) including:

a rotor shaft hole (rotor shaft hole 4) into which a rotor shaft (rotor shaft 2) is press-fitted;

a first hole group (first hole group 6) provided on an outer side of the rotor shaft hole in a radial direction and having a plurality of holes (holes 5) arranged in a circumferential direction;

a shaft holding portion (shaft holding portion 7) provided between the rotor shaft hole and the first hole group in the radial direction;

a second hole group (second hole group 9) provided on an outer side of the first hole group in the radial direction and having a plurality of holes (holes 8) arranged in the circumferential direction;

a first annular portion (first annular portion 10) provided between the first hole group and the second hole group in the radial direction; and an electromagnetic portion (electromagnetic portion 15) provided on the outer side of the second hole group in the radial direction and having a plurality of magnet insertion holes (magnet insertion holes 14) in which magnets (magnets 3) are respectively inserted, wherein:

each hole of the second hole group is arranged to intersect with an extension line (extension line L1) of a rib (rib 16) formed between the adjacent holes of the first hole group;

an inner peripheral wall (inner peripheral wall 8*c*) of each hole of the second hole group includes:

a first arc point (first arc point 8*d*) and a second arc point (second arc point 8*e*) which are located on an arc (arc A2) equidistant from a center (center CL) of the rotor core; and a convex portion (convex portion 8*g*) having an apex portion (apex portion 8*f*) on an outer side further than the arc in the radial direction; and the apex portion is located between the adjacent holes of the first hole group in the circumferential direction.

According to (1), each hole of the second hole group is arranged to intersect with the extension line of the rib formed between the adjacent holes of the first hole group. That is, since the hole of the first hole group and the hole of the second hole group are alternately arranged in the circumferential direction, the press-fitted load (tightening load) transmitted to the first annular portion through the rib located between the adjacent holes of the first hole group can be absorbed by the hole of the second hole group.

Further, the inner peripheral wall of each hole of the second hole group includes the first arc point and the second arc point located on the arc equidistant from the center of the rotor core and the convex portion having the apex portion on the outer side further than the arc in the radial direction. In addition, since the apex portion is located between the adjacent holes of the first hole group in the circumferential direction, it is possible to reduce the press-fit stress in the first annular portion by deforming the convex portion with respect to the press-fitted load of the rotor shaft. Therefore, it is possible to suppress the occurrence of non-uniform deformation (press-fit deformation) at an unintended portion of the rotor core. Further, since the stress concentration can be alleviated by the deformation of the convex portion, it is not necessary to reduce the tightening load of the rotor shaft and it is possible to suppress the reduction of the interference due to the widening of the rotor shaft hole by the centrifugal force.

(2) The rotor core according to (1), wherein the apex portion is located at a center between the adjacent holes of the first hole group in the circumferential direction.

According to (2), the apex portion is located at the center between the adjacent holes of the first hole group in the circumferential direction, and thus, the convex portion can more effectively alleviate the press-fit stress.

(3) The rotor core according to (1) or (2), wherein distances (distances H2) from the arc to the apex portions are all equal in the plurality of holes of the second hole group.

According to (3), since the distances from the arc to the apex portions are all equal in the plurality of holes of the second hole group, deformation in the plurality of holes of the second hole group can be equalized.

(4) The rotor core according to (3), wherein:

the plurality of holes of the second hole group are arranged at equal intervals in the circumferential direction; and the plurality of holes of the first hole group are arranged at equal intervals in the circumferential direction.

According to (4), the plurality of holes of the second hole group and the plurality of holes of the first hole group are arranged at equal intervals in the circumferential direction, so that the press-fitted load can be evenly received over the entire circumferential direction.

(5) The rotor core according to any one of (1) to (4), wherein:

the rotor core further includes:

a third hole group (third hole group 12) provided on an outer side of the second hole group and an inner side of the electromagnetic portion in the radial direction and having a plurality of holes (holes 11) arranged in the circumferential direction; and a second annular portion (second annular portion 13) provided between the second hole group and the third hole group in the radial direction;

each hole of the third hole group is arranged to intersect with an extension line (extension line L2) of a rib (rib 17) formed between the adjacent holes of the second hole group; and an inner peripheral wall (inner peripheral wall 11*c*) of each hole of the third hole group includes:

a first arc point (first arc point 11*d*) and a second arc point (second arc point 11*e*) which are located on an arc (arc A3) equidistant from the center of the rotor core; and a convex portion (convex portion 11*g*) having an apex portion (apex portion 11*f*) on an outer side further than the arc in the radial direction.

According to (5), each hole of the third hole group is arranged to intersect with the extension line of the rib formed between the adjacent holes of the second hole group.

That is, since the hole of the second hole group and the hole of the third hole group are alternately arranged in the circumferential direction, and the press-fitted load transmitted to the second annular portion through the rib located between the adjacent holes of the second hole group can be absorbed by the hole of the third hole group.

Further, since the inner peripheral wall of each hole of the third hole group includes the first arc point and the second arc point which are located on the arc equidistant from the center of the rotor core and the convex portion having the apex portion on an outer side further than the arc in the radial direction, the press-fit stress in the second annular portion can be reduced with regard to the press-fitted load of the rotor shaft.

(6) The rotor core according to (5), wherein the apex portion of each hole of the third hole group is located between the adjacent holes of the second hole group in the circumferential direction.

According to (6), since the apex portion of each hole of the third hole group is located at the center between adjacent holes of the second hole group in the circumferential direction, the convex portion can more effectively alleviate the press-fit stress.

The invention claimed is:

1. A rotor core comprising:
a rotor shaft hole into which a rotor shaft is press-fitted;
a first hole group provided on an outer side of the rotor shaft hole in a radial direction and having a plurality of holes arranged in a circumferential direction;
a shaft holding portion provided between the rotor shaft hole and the first hole group in the radial direction;
a second hole group provided on an outer side of the first hole group in the radial direction and having a plurality of holes arranged in the circumferential direction;
a first annular portion provided between the first hole group and the second hole group in the radial direction; and
an electromagnetic portion provided on the outer side of the second hole group in the radial direction and having a plurality of magnet insertion holes in which magnets are respectively inserted, wherein:
each hole of the second hole group is arranged to intersect with an extension line of a rib formed between the adjacent holes of the first hole group;
an inner peripheral wall of each hole of the second hole group includes:
a first arc point and a second arc point which are located on an arc equidistant from a center of the rotor core; and
a convex portion having an apex portion on an outer side further than the arc in the radial direction; and
the apex portion is located between the adjacent holes of the first hole group in the circumferential direction.

2. The rotor core according to claim 1, wherein the apex portion is located at a center between the adjacent holes of the first hole group in the circumferential direction.

3. The rotor core according to claim 1, wherein distances from the arc to the apex portions are all equal in the plurality of holes of the second hole group.

4. The rotor core according to claim 3, wherein:
the plurality of holes of the second hole group are arranged at equal intervals in the circumferential direction; and
the plurality of holes of the first hole group are arranged at equal intervals in the circumferential direction.

5. The rotor core according to claim 1, further comprising:
a third hole group provided on an outer side of the second hole group and an inner side of the electromagnetic portion in the radial direction and having a plurality of holes arranged in the circumferential direction; and
a second annular portion provided between the second hole group and the third hole group in the radial direction, wherein:
each hole of the third hole group is arranged to intersect with an extension line of a rib formed between the adjacent holes of the second hole group; and
an inner peripheral wall of each hole of the third hole group includes:
a first arc point and a second arc point which are located on an arc equidistant from the center of the rotor core; and
a convex portion having an apex portion on an outer side further than the arc in the radial direction.

6. The rotor core according to claim 5, wherein the apex portion of each hole of the third hole group is located between the adjacent holes of the second hole group in the circumferential direction.

* * * * *